Patented July 26, 1932

1,868,890

UNITED STATES PATENT OFFICE

CARL EYER AND FRIEDRICH KORN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

MIXED FERTILIZER

No Drawing. Application filed May 12, 1930, Serial No. 451,838, and in Great Britain April 14, 1930.

The present invention relates to improvements in the production of mixed fertilizers containing ammonium nitrate.

The production of mixed fertilizers containing ammonium nitrate, in a form in which they can be readily scattered, from the corresponding melts, is often attended with great difficulties because the melts are rather viscous, especially if they contain calcium carbonate, and can only be obtained by the application of relatively high temperatures.

We have now found that these difficulties can be easily avoided by adding to the melts of the mixed fertilizers containing ammonium nitrate small quantities of one or more water-soluble magnesium salts. As a rule, comparatively small quantities of the said additions, for example about 6 per cent and even less, say from 3 to 6 per cent, are sufficient.

The melts prepared in accordance with the present invention remain liquid, and possess a rather low viscosity even at comparatively low temperatures and therefore can easily be sprayed into a globular form.

The following examples will further illustrate how the invention may be carried out in practice, but the invention is not limited thereto. The parts are by weight.

Example 1

45 parts of magnesium chloride are introduced into a melt of 1000 parts of ammonium nitrate containing about 8 per cent of water and thereupon 525 parts of fine granular calcium carbonate are added. The homogeneous mass is sprayed at about 105° C., whereby uniform globules are obtained.

Example 2

15 parts of magnesium nitrate in the form of the solid salt or of an aqueous solution and 300 parts of ammonium sulphate are introduced into a melt of 240 parts of ammonium nitrate containing 8 per cent of water. The thinly liquid melt is then evaporated until it contains only about 1 per cent of water and sprayed and solidified at about 175° C. by means of a centrifuge. Very uniform and hard globules of the product are obtained thereby.

What we claim is:—

1. In the production of solid fertilizers by solidification of melts containing substantial amounts of ammonium nitrate, the step of adding to the melt a small amount of a water-soluble magnesium salt.

2. In the production of solid fertilizers by solidification of melts containing substantial amounts of ammonium nitrate, the step of adding to a melt comprising ammonium nitrate and ammonium sulphate a small amount of a water-soluble magnesium salt.

3. In the production of solid fertilizers by solidification of melts containing substantial amounts of ammonium nitrate, the step of adding to the melt not more than 6 per cent of a water-soluble magnesium salt.

4. In the production of solid fertilizers by solidification of melts containing substantial amounts of ammonium nitrate, the step of adding to a melt comprising ammonium nitrate and ammonium sulphate not more than 6 per cent of a water-soluble magnesium salt.

5. In the production of solid fertilizers by solidification of melts containing substantial amounts of ammonium nitrate, the step of adding to the melt a small amount of a water-soluble magnesium salt selected from the group consisting of magnesium chloride and magnesium nitrate.

6. In the production of solid fertilizers by solidification of melts containing substantial amounts of ammonium nitrate, the step of adding to a melt comprising ammonium nitrate and ammonium sulphate a small amount of a water-soluble magnesium salt selected from the group consisting of magnesium chloride and magnesium nitrate.

7. In the production of solid fertilizers by solidification of melts containing substantial amounts of ammonium nitrate, the step of adding to the melt not more than 6 per cent of a water-soluble magnesium salt selected from the group consisting of magnesium chloride and magnesium nitrate.

8. In the production of solid fertilizers by solidification of melts containing substantial amounts of ammonium nitrate, the step of adding to a melt comprising ammonium nitrate and ammonium sulphate not more than 6 per cent of a water-soluble magnesium salt selected from the group consisting of magnesium chloride and magnesium nitrate.

9. The process of producing a solid fertilizer which comprises adding a small amount of magnesium chloride to a melt of ammonium nitrate, adding calcium carbonate and spray-solidifying the mixture.

10. The process of producing a solid fertilizer which comprises adding ammonium sulphate and a small amount of magnesium nitrate to an ammonium nitrate melt and spray-solidifying the mixture.

In testimony whereof we have hereunto set our hands.

CARL EYER.
FRIEDRICH KORN.